United States Patent
Irie (10) Patent No.: US 6,832,126 B2
(45) Date of Patent: Dec. 14, 2004

(54) CONTROL APPARATUS FOR WIRE CUT ELECTRIC DISCHARGE MACHINE

(75) Inventor: Takeshi Irie, Kariya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 519 days.

(21) Appl. No.: 09/797,832

(22) Filed: Mar. 5, 2001

(65) Prior Publication Data

US 2002/0002417 A1 Jan. 3, 2002

(30) Foreign Application Priority Data

Jun. 28, 2000 (JP) ........................................ 2000-194673

(51) Int. Cl.⁷ .............................. G06F 19/00; B23H 1/04
(52) U.S. Cl. ................. 700/162; 219/69.11; 219/69.12; 219/69.16
(58) Field of Search ....................... 700/162; 219/69.12, 219/69.11, 69.17, 69.16

(56) References Cited

U.S. PATENT DOCUMENTS

| | | | | |
|---|---|---|---|---|
| 5,233,147 A | * | 8/1993 | Magara | 219/69.12 |
| 5,306,889 A | * | 4/1994 | Kaneko et al. | 219/69.12 |
| 5,453,592 A | * | 9/1995 | Takeuchi et al. | 219/69.12 |
| 5,756,954 A | * | 5/1998 | Kamiguchi et al. | 219/69.12 |

FOREIGN PATENT DOCUMENTS

JP A 60-108219 6/1985

* cited by examiner

*Primary Examiner*—Albert W. Paladini
(74) *Attorney, Agent, or Firm*—Oliff & Berridge, PLC (57) ABSTRACT

In a wire cut electric discharge machine, a correction block is inserted into a corner of a movement path where the wire electrode is moved by the electrode moving device. The correction block does not correspond to the contour of the workpiece to be machined. When it is necessary to change machining condition such as the voltage to be applied to the wire electrode before and after the corner, a changing position to change the machining condition is set on the correction block.

9 Claims, 7 Drawing Sheets

CONTROL APPARATUS FOR WIRE CUT ELECTRIC DISCHARGE MACHINE

BACKGROUND OF THE INVENTION

1. Field of Invention

The invention relates to a wire cut electric discharge machine where a wire electrode is moved relative to a workpiece so as to machine the workpiece using an electric discharge. In particular, the invention relates to a control apparatus that controls the wire cut electric discharge machine, a method of controlling the wire cut electric discharge machine, and a storage medium to execute the method.

2. Description of Related Art

Figure 6:
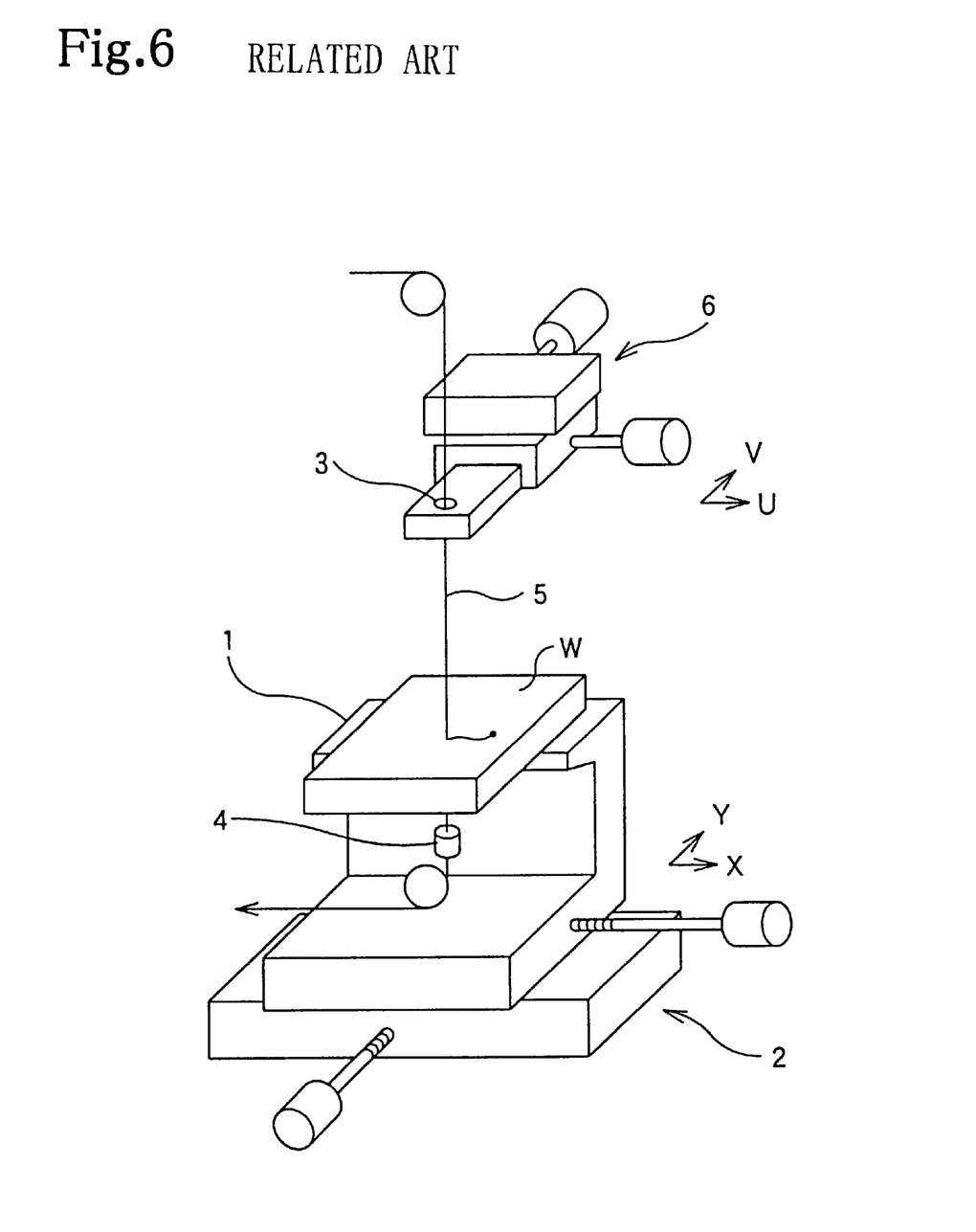
FIG. 6 schematically illustrates substantial parts of a conventional wire cut electric discharge machine.

There are various wire cut electric discharge machines that give a workpiece electric discharge machining by moving a wire electrode relative to the workpiece. FIG. 6 shows an explanatory drawing of a wire cut electric discharge machine. As shown in FIG. 6, in the wire cut electric discharge machine, a machine table 1 supporting a workpiece W is moved freely on an XY plane by a XY drive mechanism 2. An upper wire guide 3 is disposed at an upper portion of the workpiece W, and a lower wire guide 4 is disposed securely at a lower portion of the workpiece W. A wire 5 is provided so as to hang across the upper wire guide 3 and the lower wire guide 4 with a predetermined tension, created by a wire drive mechanism, not shown.

The upper wire guide 3 is moved freely on a UV plane, which is parallel to the XY plane, by a UV drive mechanism 6. Thus, if the XY drive mechanism 2 is activated under the condition that the upper wire guide 3 is secured immediately above the lower wire guide 4, machining can be given to the workpiece W along a vertical plane. If the upper wire guide 3 is shifted from the top of the lower wire guide 4, tapering can be given to the workpiece W.

Figure 7:
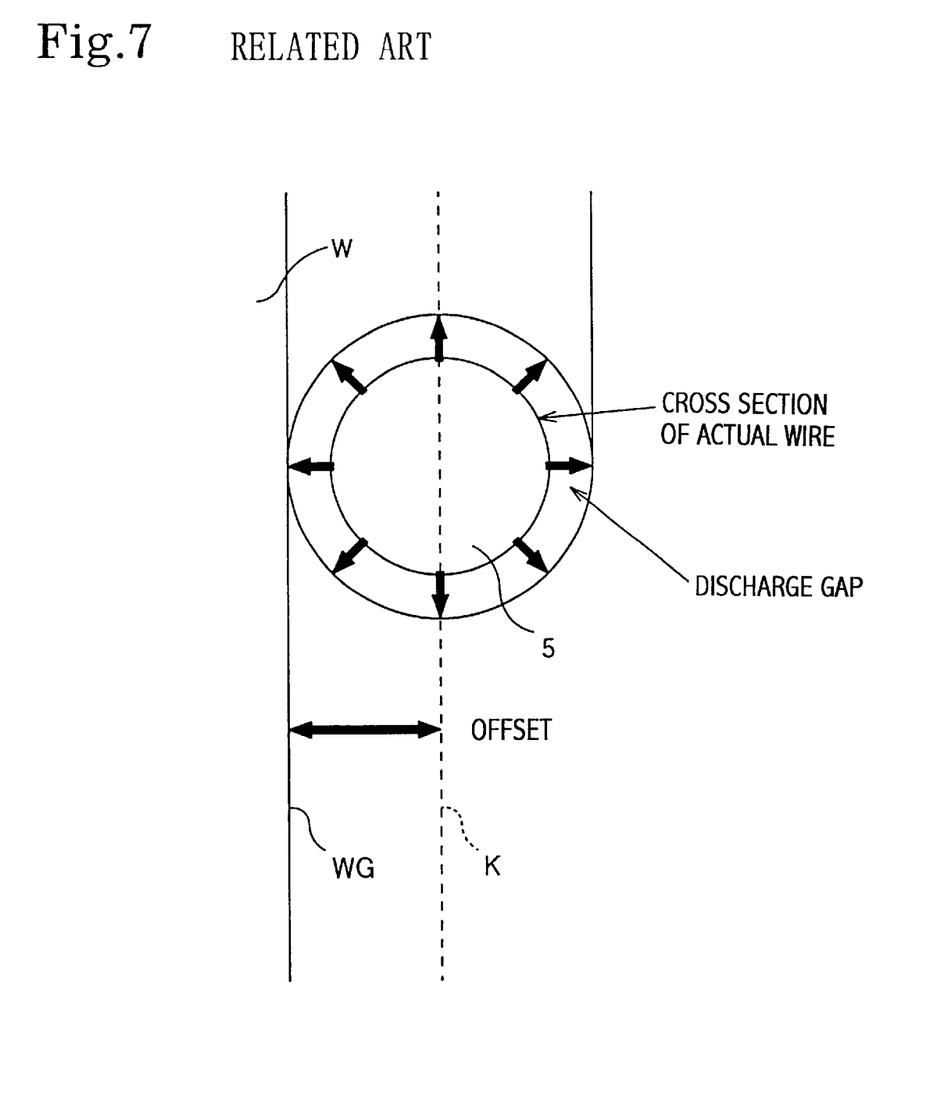
FIG. 7 is a schematic view illustrating definition of an offset from the path.

During a normal machining, if a workpiece is machined along a contour WG, i.e., an outline of the workpiece, as shown in FIG. 7, for example, drive mechanisms 2, 6 are controlled so as to move the center of the wire 5 along a movement path K which is away from the contour WG for a predetermined offset (a discharge gap of the wire 5+a radius of the wire 5). In Japanese Laid-Open Patent Publication No. 60-108219, when a corner of the contour WG is machined, a correction block, which does not correspond to the contour WG, is inserted in the movement path K. Machining accuracy is increased and machining time is reduced at corners because needless movement is omitted from the corners.

The discharge gap is the distance at which the discharge is generated between the wire electrode and the workpiece. The wire electrode applies an electrical discharge to the workpiece from a distance of the discharge gap. The discharge gap varies according to the machining condition, such as voltage. The higher the voltage is, the larger the discharge gap becomes. The lower the voltage is, the smaller the discharge gap becomes. Generally, the discharge gap is larger for rough machining, and smaller for fine machining.

In the Numerical Control program, a block is a unit of movement along the movement path where the wire electrode is moved to machine a workpiece. One command corresponds to one block. There is a straight block whose path is straight, and an arc block whose path is arced. A corner is a joint between blocks. Therefore, a workpiece may be machined into an angular shape at the corner.

On the corner, voltage to be applied to the wire electrode may be changed. In other words, the voltage may be changed at the corner in accordance with changes of a taper angle of the workpiece and a degree of the machining fluid that is sprayed into the workpiece. Because the discharge gap varies as the voltage changes, the shape of the workpiece W, to be obtained, may differ when the voltage is changed at the start point of the correction block and when the voltage is changed at the end point of the correction block. Furthermore, the workpiece W might not be machined into a desired shape.

SUMMARY OF THE INVENTION

The invention provides a control apparatus for a wire cut electric discharge machine capable of changing a machining condition, such as a voltage to be applied to the wire electrode, which entails a change of a discharge gap of the wire electrode, to cause the machine to machine the workpiece into a desired shape by setting a position to change the machining condition appropriately; a method of controlling the wire cut electric discharge machine; and a storage medium to execute the method.

In an exemplary aspect of the invention, a control apparatus that controls a wire cut electric discharge machine having an electrode moving device that moves a wire electrode relative to a workpiece, may include a machining condition changing device that changes a machining condition entailing a change of a discharge gap generated by the wire electrode, a correction block inserting device that inserts a correction block into a corner of a movement path where the wire electrode is moved by the electrode moving device, the correction block not corresponding to the contour of the workpiece to be machined, and a changing position setting device that sets a changing position to change the machining condition on the correction block when the machining condition changing device needs to change the machining condition before and after the corner.

In the wire cut electric discharge machine, the wire electrode is moved relative to a workpiece to be machined by the electrode moving device, so that the workpiece can be machined into a desired shape, and the machining condition that entails the change of the discharge gap generated by the wire electrode can be changed by the machining condition changing device.

In the control apparatus, a correction block that does not correspond to the contour of the workpiece can be inserted in the corner of the movement path where the wire electrode is moved by the electrode moving device. When it is necessary to change the machining condition before and after the corner, the position change setting device sets the position to change the machining condition on the correction block.

In other words, when the correction block is not inserted, the changing position to change the machining condition is inevitably determined to a position corresponding to the corner. However, when the correction block is inserted, the changing position is set on the correction block. Thus, if the machining condition that entails the change of the discharge gap is changed, the wire cut electric discharge machine can be controlled so as to machine the workpiece into a desired shape.

In another exemplary aspect of the invention, the changing position setting device may automatically set the changing position to a position where a rim of the wire electrode is away from the contour of the workpiece to be machined by a distance equal to or greater than either of the discharge gaps set before and after the machining condition is changed, whichever is larger.

When the rim of the wire electrode is away from the contour of the workpiece to be machined by a distance equal to or greater than either of the discharge gaps set before and after the machining condition is changed, whichever is larger, if the machining condition is changed at the position, the contour of the workpiece is unaffected. The changing position change setting device automatically sets the changing position to change the machining condition in such a position. As the changing position is set as mentioned above, the wire cut electric discharge machine can be controlled so as to machine workpiece into a desired shape more reliably. As the changing position is set automatically, the operationality of the wire cut electric discharge machine can be further improved.

In a further exemplary aspect of the invention, the changing position setting device may set the changing position only when a change of the machining condition entails a change of the discharge gap.

Even though the machining condition is changed during an electric discharge machining of a workpiece, as long as the discharge gap is not changed, the contour of the workpiece is unaffected. The changing position to change the machining condition is set only when the change of the machining condition entails the change of the discharge gap. Therefore, redundant processes are omitted, so that the entire control process can be performed faster.

BRIEF DESCRIPTION OF THE DRAWINGS

The invention will be described in greater detail with reference to preferred exemplary embodiments thereof and the accompanying drawings wherein.

DETAILED DESCRIPTION OF PREFERRED EMBODIMENTS

Figure 1:
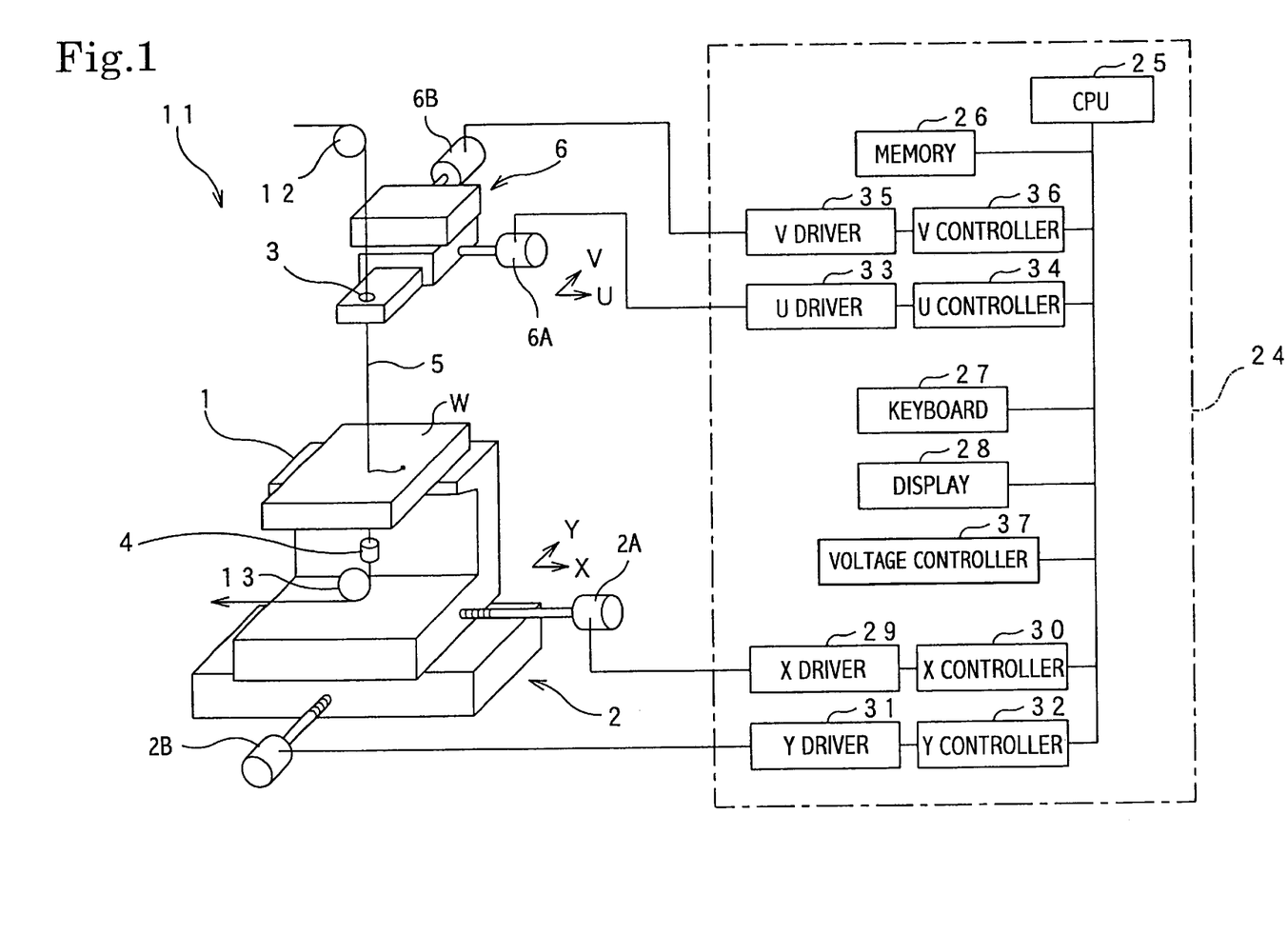
FIG. 1 schematically illustrates substantial parts of a wire cut electric discharge machine and its control apparatus according to one exemplary embodiment to which the invention is applied.

An exemplary embodiment of the invention will be described in detail with reference to the accompanying drawings. FIG. 1 schematically illustrates substantial parts of the wire cut electric discharge machine 11 and a control apparatus 24 according to one exemplary embodiment to which the invention is applied.

As shown in FIG. 1, the XY drive mechanism 2 of the wire cut electric discharge machine 11 includes an X-axis motor 2A and a Y-axis motor 2B which are both made of servomotors with encoders. When the X-axis motor 2A and the Y-axis motor 2B are activated, the machine table 1 is moved freely on the XY plane. Similarly, the UV drive mechanism 6 includes a U-axis motor 6a and a V-axis motor 6b, which are both made of servomotors with encoders. When the U-axis motor 6a and the V-axis motor 6b are activated, the upper wire guide 3 is moved freely on the UV plane.

To avoid making descriptions complicated, drawings and descriptions will be simplified. The UV drive mechanism 6 is freely moved by a Z-axis drive mechanism in a Z axis (vertically), thus making it possible to adjust the height of the upper wire guide 3. As described above, the wire 5, as a wire electrode, is provided to extend between the upper wire guide 3 and the lower wire guide 4 with a predetermined tension. The wire 5 is fed from a supply reel, not shown, and taken up to a winding roller, not shown, via the upper guide roller 12, the upper wire guide 3, the lower wire guide 4, and the lower guide roller 13. Thus, the wire 5 is sent from top to bottom. Furthermore, although not shown, the wire electric discharge machine 11 includes an electric discharge mechanism that generates electrical discharge by placing a voltage between the wire 5 and the workpiece W.

Each mechanism of the wire cut electric discharge machine 11 is controlled by a control apparatus 24. The control apparatus 24 is designed so as to mutually connect a CPU 25 that executes calculations, a memory 26 that stores control programs, machining programs and various data, and a display 28 that shows various indications.

The CPU 25 controls an X driver 29 that drives an X-axis motor 2A via an X controller 30; a Y driver 31 that drives a Y-axis motor 2B via a Y controller 32; a U driver 33 that drives a U-axis motor 6a via a U controller 34; and a V driver 35 that drives a V-axis motor 6b via a V controller 36. Further, the CPU 25 controls a voltage to be applied between the wire 5 and the workpiece W by the electric discharge mechanism, via a voltage controller 37. It is not represented graphically, but the CPU 35 also controls the wire drive mechanism that feeds the wire 5 from top to bottom, and the Z-axis drive mechanism.

The control apparatus 24 structured in such a manner, controls each mechanism of the wire cut electric discharge machine 11 according to machining programs, and causes the workpiece W to be relatively moved on the XY or UV plane while giving electrical discharge across the wire 5 and the workpiece W, so that the workpiece W is cut into a desired shape.

Next, a process the control apparatus 24 executes will be described with a particular emphasis on controlling the machine at corners. It will be assumed that the upper wire guide 3 is secured directly above the lower wire guide 4 to form a vertical cutting plane on the workpiece W. The description will also be interpreted as a process used for first widening the workpiece W to tapering the workpiece W.

Figure 2:
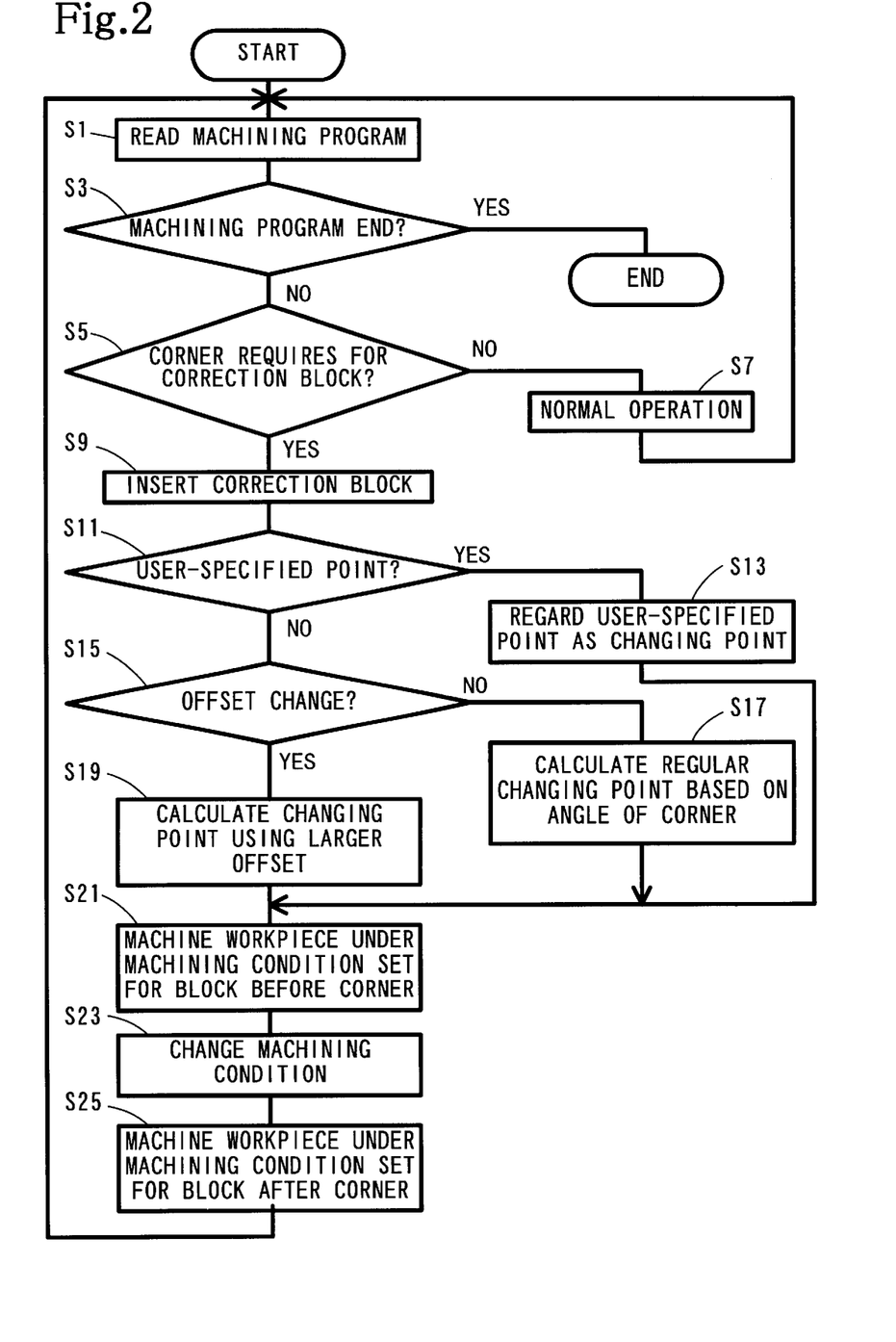
FIG. 2 is a flowchart of a process executed in the control apparatus.

FIG. 2 is a flowchart representing a process the CPU 25 executes when running a machining program stored in the memory 26. When the CPU 25 starts the process, it reads the machining program in succession from the start (S1). The CPU 25 determines whether a piece of data read represents the end of the machining program (S3). When it does not represent the end of the machining program (S3: No), the CPU 25 goes to S5 to determine whether the data that has been read at S1 is related to machining of a corner and requires correction block insertion. If the data does not require correction block insertion (S5: No), the CPU 25 executes the machining program normally (S7), and goes to S1. At S7, machining is made along a straight line or a gentle curve.

Figure 3A:
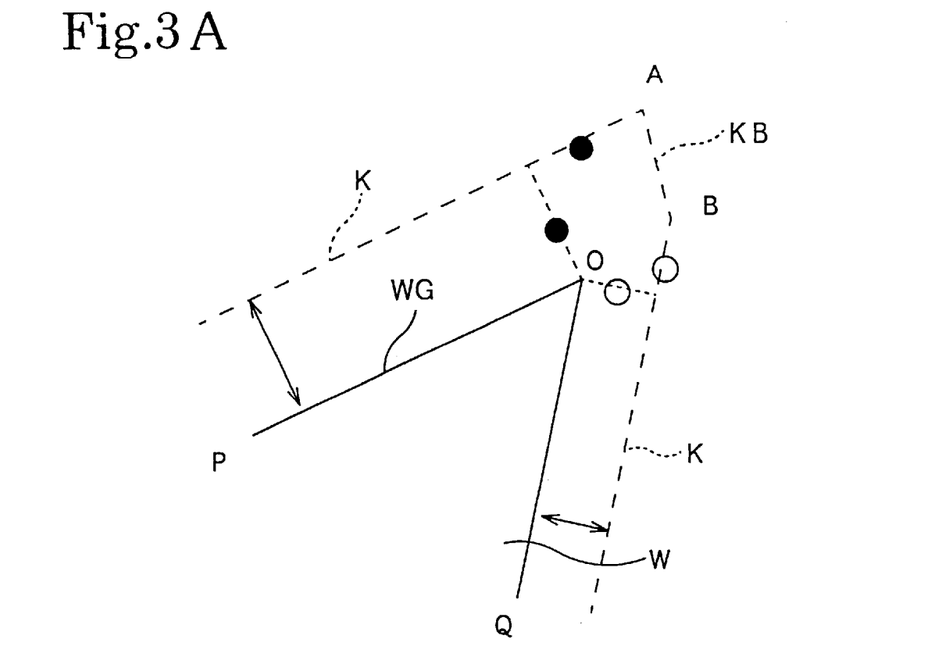
FIG. 3A illustrates an example where a correction block is inserted in a path where the wire electrode moves in machining a sharp corner.

While the data that has been read at S1 requires correction block insertion (S5: Yes), the CPU 25 inserts a correction block in relation to the corner at S9. Correction block insertion occurs when a sharp contour WG represented by points P, O, Q as shown in FIG. 3A is finally obtained. When this occurs, a correction block KB represented by segment AB is inserted into a movement path K of the wire 5. As shown in FIG. 3A, the insertion of the correction block KB shortens the movement path K, thus reducing the machining time. In FIG. 3A, lines with circles represented by the same color (● or ○) are equal in length. The use of correction block is used not only for shortening the path but also improving the machining accuracy of the angles, such as right angles.

After inserting the correction block at S9, the CPU 25 executes S11 to S19 to calculate the end point of a block just before the corner. Even after the correction block is inserted as mentioned above, when the machining program is run, it is necessary to specify to which position is handled as "before the corner" and from which position is handled as "after the corner." Hereinafter, the final position on the correction block, where machining is made under the machining condition set for a block before the corner, is referred to as a changing point.

The CPU 25 determines whether there is a user-specified point setting at S11. If a point is specified by a user (S11: Yes), the CPU 25 regards the point as the changing point (S13). For example, when the user has pre-specified any one of the beginning point, middle point or end point of the correction block, the CPU 25 regards the beginning point, middle point or end point of the correction block inserted at S9 as the changing point.

When there is not a user-specified point (S11: No), the CPU 25 determines whether there is a change of machining condition that entails the offset change (S15). The machining condition entailing the offset change includes a voltage to be applied to the wire electrode, a cycle of electrical discharge, and a flow rate of machining fluid.

If there is no offset change in the corner (S15: No), the CPU regards the stop point that will be found in the usual way based on an angle of the corner, as the changing point (S17). On the other hand, when there is an offset change (S15: Yes), a point on the correction block is determined as the changing point (S19). Such a point should be away from the contour WG of the workpiece W by a distance equal to or greater than either of the offsets set before and after the corner, whichever is larger.

The process at S19 will now be described with reference to FIG. 3B. As described using FIG. 3A, when the correction block KB is inserted (S9), an imaginary circle L is created whose center is point ○ on the corner of the contour WG with a radius equal to the larger offset (indicated with ●). Only a range indicated with M of the correction block KB is disposed outside of the circle L. At S19, the changing point is set within the range indicated with M of the correction block KB. In other words, when the machining condition that entails the offset change is changed at a point inside the circle L, if the machining condition has focused on the larger offset (indicated with ●), a desired contour can not be obtained because the discharge gap reaches the inside of the contour WG. On the contrary, if the machining condition is changed within the range specified with M, the discharge gap can be preferably prevented from reaching inside of the contour WG.

After the changing point is calculated (S13, S17, S19), the machining process for the block before the corner is executed (S21), the machining condition is changed as necessary (S23), the machining process for the block after the corner is executed (S25), and the CPU 25 returns to S1. Thus, the CPU 25 executes corresponding machining process while reading the machining program in succession (S1), and finishes the process when reading data representing the end of the machining program (S3: Yes).

In the control apparatus 24, the correction block can be inserted in the corner (S9). When the machining condition that entails the change of the discharge gap before and after the corner is changed (S15: Yes), the machining condition is changed at such a position that the larger discharge gap can not reach the inside of the contour WG (S23). Thus, this enables the wire cut electric discharge machine 11 to machine the workpiece W into a desired shape.

In the control apparatus 24, the process (S19), where the position to change the machining condition (that is the changing point) is calculated based on the circle L, is executed only when the offset (the discharge gap+the radius of the wire 5) varies before and after the corner (S15: Yes). The process at S19 is more time-consuming than the processes at S13 and S17. However, in the exemplary embodiment of the invention, because such a time-consuming process is executed only when necessary, redundant processes are omitted, so that the whole of the control process can be performed faster.

The method for setting the changing point within the range specified in M is conceivable in various ways. However, when the start or end point of the correction block KB, which is included in the range, is selected, the process at S19 can be simplified further. As with S17, when a stop point that will be found in the usual way is in the range specified with M, the stop point may be regarded as the changing point.

Figure 3B:
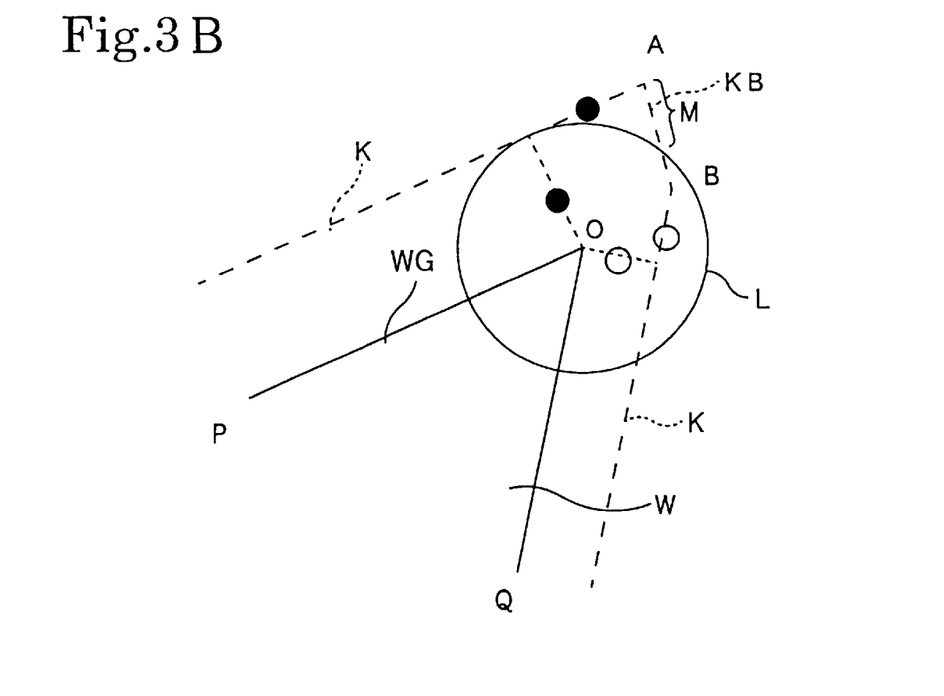
FIG. 3B illustrates a method of setting a position to change machining condition in the correction block of FIG. 3A.
Figure 4:
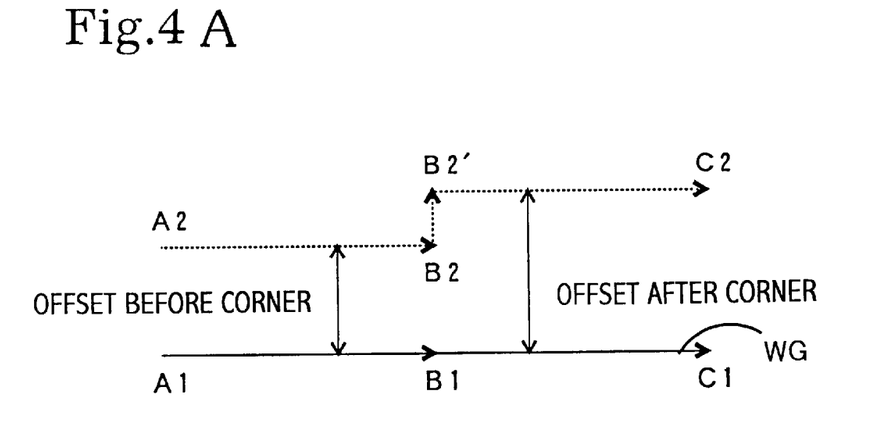
FIG. 4A shows an example where a correction block is inserted in the path in machining a 180° corner.
FIG. 4B shows another example where a correction block is inserted in the path in machining a 180° corner.

The process at S19 is not limited to the corner as shown in FIGS. 3A and 3B. The process can be applied to various corners. FIGS. 4A and 4B illustrate an example of so-called 180° corner machining where the offset changes at the middle point B1 of the contour WG represented with segment A1–C1. In this case, a correction block B2–B2' is inserted in a position facing the point B1. As shown in FIG. 4A, when machining is made in the order of A1, B1, and C1 as the wire 5 moves in the order of points A2, B2, B2' and C2 and, as shown in FIG. 4B, when machining is made in the order of C1, B1 and A1 as the wire 5 moves in the order of points C2, B2', B2 and A2, the machining condition is changed at the point B2' on the correction block where either of the offsets set before and after the corner, whichever is larger, is set.

Figure 5:
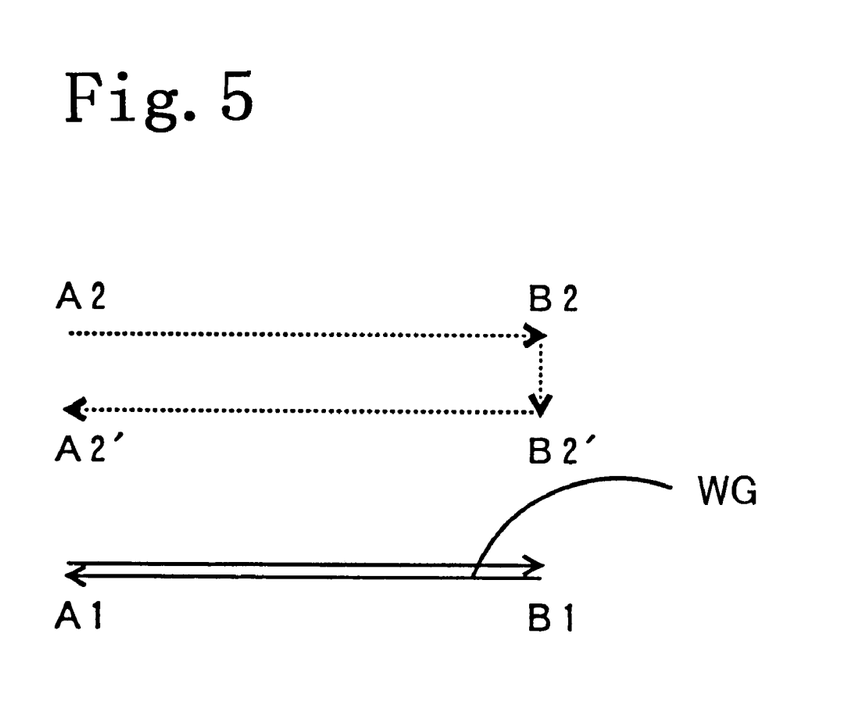
FIG. 5 illustrates an example where a correction block is inserted in the path in machining a 360° corner.

FIG. 5 illustrates an example of a so-called 360° corner machining where the wire 5 reciprocates on the contour WG represented with segment A1–B1. If the offset varies between the go path A2–B2 and the return path B2'–A2', the correction block is inserted between points B2 and B2'. In this case, the machining condition is also changed at the point B2 on the correction block where either of the offsets set before and after the corner, whichever is larger, is set.

In the exemplary embodiment as mentioned above, S9 functions as a correction block inserting device, and S19 functions as a changing position setting device. In the wire cut electric discharge machine 11, the XY drive mechanism 2 and the UV drive mechanism 6 functions as an electrode moving device, and the electric discharge mechanism that is controlled by the voltage controller 37 functions as a machining condition changing device.

It should be appreciated that the invention is not limited in its application to the details of structure and arrangement of parts illustrated in the accompanying drawings. The invention is capable of other exemplary embodiments and of being practiced or performed in various ways without departing from the technical idea thereof, based on existing and well-known techniques among those skilled in the art. For example, if the workpiece is maintained in the fluid during machining, the discharge gap may change according to the fluid flow rate and the electric discharging cycle. Accordingly, S23 can be intended to change the discharge gap by changing the fluid flow rate and the electric discharging cycle. As a storage medium that stores computer programs to control the wire cut electric discharge machine, memory and other media can be thought. For example, a compact disc-read-only memory (CD-ROM), a floppy disk (FD), a magneto-optic disk (MOD), a hard disk, and a file server on the Internet can be also available. Furthermore, the method of setting a changing position to change the machining condition to a proper position on the correction block, is not limited to the above-mentioned form. It can be developed into different forms.

What is claimed is:

1. A control apparatus that controls a wire cut electric discharge machine having an electrode moving device that moves a wire electrode relative to a workpiece, the control apparatus comprising:

a controller that:

changes a discharge gap generated by the wire electrode;

inserts a correction block into a corner of a movement path where the wire electrode is moved by the electrode moving device, wherein the correction block does not correspond to a contour of the workpiece to be machined; and sets a changing position to change the discharge gap based on the correction block when the discharge gap needs to be changed before and after the corner.

2. The control apparatus according to claim 1, wherein the controller automatically sets the changing position to a position where a rim of the wire electrode is away from the contour of the workpiece to be machined by a distance equal to or greater than either of discharge gaps set before and after the discharge gap is changed, whichever is larger.

3. A method of controlling a wire cut electric discharge machine having an electrode moving device that moves a wire electrode relative to a workpiece, comprising the steps of:

changing a discharge gap generated by the wire electrode;

inserting a correction block into a corner of a movement path where the wire electrode is moved by the electrode moving device, wherein the correction block does not correspond to a contour of the workpiece; and setting a changing position to change the discharge gap based on the correction block when it is necessary to change the discharge gap before and after the corner.

4. The method according to claim 3, wherein in the step of setting the changing position to change the discharge gap, the changing position is automatically set only when a rim of the wire electrode is away from the contour of the workpiece to be machined by a distance equal to or greater than either of discharge gaps set before and after the discharge gap is changed, whichever is larger.

5. A storage medium storing a program executed by a computer to control a wire cut electric discharge machine having an electrode moving device that moves a wire electrode relative to a workpiece, the program comprising:

a routine that changes a discharge gap generated by the wire electrode a routine that inserts a correction block into a corner of a movement path where the wire electrode is moved by the electrode moving device, wherein the correction block does not correspond to a contour of the workpiece to be machined; and a routine that sets a changing position to change the discharge gap based on the correction block when it is necessary to change the discharge gap before and after the corner.

6. The storage medium according to claim 5, wherein in the routine that sets the changing position, the changing position is automatically set to a position where the wire electrode is away from the contour of the workpiece to be machined by a distance equal to or greater than either of discharge gaps set before and after the discharge gap is changed, whichever is larger.

7. A wire cut electric discharge machine, comprising:

an electrode moving device that moves a wire electrode relative to a workpiece; and a controller that:

changes a discharge gap generated by the wire electrode;

inserts a correction block into a corner of a movement path where the wire electrode is moved by the electrode moving device, wherein the correction block does not correspond to a contour of the workpiece to be machined; and sets a changing position to change the discharge gap based on the correction block when the discharge gap needs to be changed at the corner.

8. A method of controlling a wire cut electric discharge machine having an electrode moving device that moves a wire electrode relative to workpiece during a change of a discharge gap, comprising the steps:

inserting a correction block into a corner of a movement path; and setting a changing position to change a discharge gap based on the correction block when it is necessary to change the discharge gap before and after the corner.

9. The method according to claim 8, wherein the changing position is automatically set only when a rim of a wire electrode is away from a contour of the workpiece to be machined by a distance equal to or greater than either of discharge gaps set before and after the discharge gap is changed, whichever is larger.

* * * * *